Figure 1:
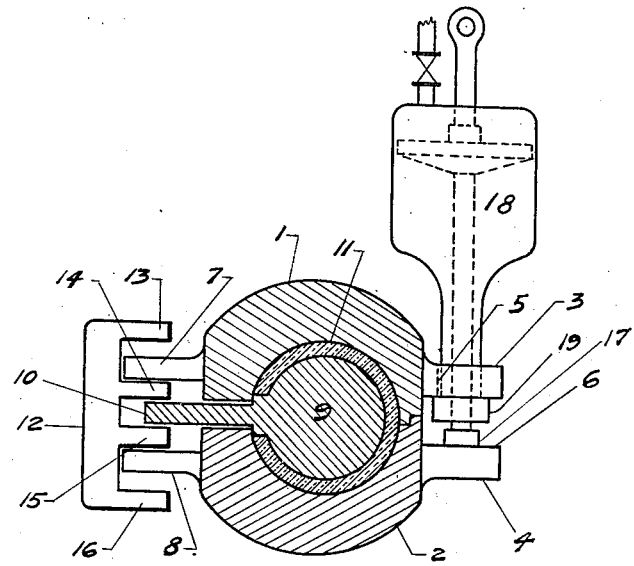

E. G. HULSE.
MOLD OPENING DEVICE.
APPLICATION FILED OCT. 28, 1916.

1,369,435.

Patented Feb. 22, 1921.
2 SHEETS—SHEET 1.

INVENTOR
EDISON G. HULSE
BY:— R.H.Waters
ATTORNEY

E. G. HULSE.
MOLD OPENING DEVICE.
APPLICATION FILED OCT. 28, 1920.

1,369,435.

Patented Feb. 22, 1921.
2 SHEETS—SHEET 2.

INVENTOR
EDISON G. HULSE
BY:-
ATTORNEY

UNITED STATES PATENT OFFICE.

EDISON G. HULSE, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

MOLD-OPENING DEVICE.

1,369,435.          Specification of Letters Patent.          Patented Feb. 22, 1921.

Application filed October 28, 1920. Serial No. 420,206.

*To all whom it may concern:*

Be it known that I, EDISON G. HULSE, a citizen of the United States, residing at Cumberland, in the county of Allegany and State of Maryland, have invented certain new and useful Improvements in Mold-Opening Devices, of which the following is a specification.

My invention relates to the art of molding or vulcanizing an article of manufacture wherein the article is formed about a rigid core, which afterward is introduced within a separable mold for molding or vulcanizing; and particularly to an improved method of opening said mold and separating the core therefrom by the novel means provided. The invention has particular reference to the art of molding or vulcanizing an article composed in whole or in part of rubber or analogous substance, wherein there is a tendency of the molded article to adhere to the contacting surfaces of the mold device, thus rendering its final separation therefrom a matter of considerable difficulty. It will, of course, be appreciated that the invention is not limited to the above use but may be employed in any form of molding to which this invention is applicable.

In the process of separating such a mold as the one described, and likewise the extraction of the core with its surrounding manufacture, great difficulty has been encountered due to the sticking of the substance on the core to the two contacting portions of the mold. Heretofore it has been the usual practice to manually pry open the halves of the mold with a pinch-bar or similar fulcrum implement, the operation of which necessitates the employment of great force applied intermittently and violently, thus frequently resulting not only in the defacing of the article of manufacture, the mold and the core, but in injury to the operator.

The principal objects of my invention are; to provide means for separating the halves of the mold and automatically and by the same operation to break the core progressively away from the surfaces of the mold; to provide certain means on the mold to permit the attachment of the opening device from either side of the mold; and especially to attain a higher degree of efficiency in the art to which this invention relates by insuring a safe and reliable method for performing the desired operation, thus relieving against the incidents of the crude method of manual separation.

With these and other objects in view the invention consists in the novel construction and arrangement of the parts hereinafter described, delineated in the drawings and claimed, it being understood that the invention shown and described relates to my preferred form but other forms may be adopted without departing from the scope and spirit of the invention. In the annexed drawings similar numerals of reference are employed to denote corresponding parts throughout the several views of the invention.

Figure 2:
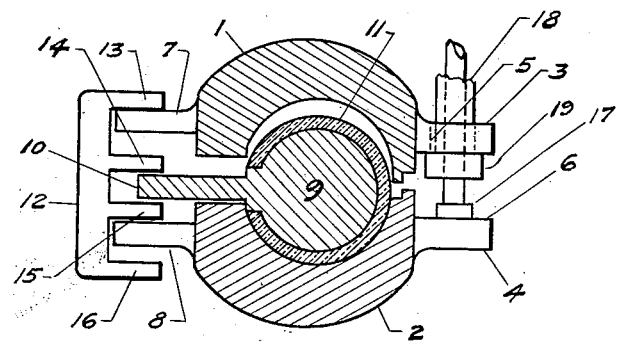
Figure 3:
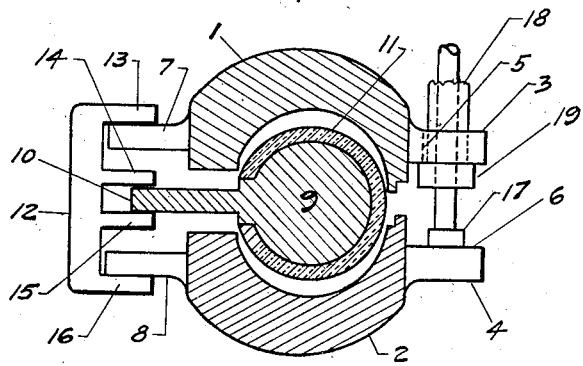

Figures 1, 2, and 3 are of the same typical cross section through an assembled mold and core showing the various stages of progressive separation of the elements, the progressive stages being in numerical order.

Figure 4:
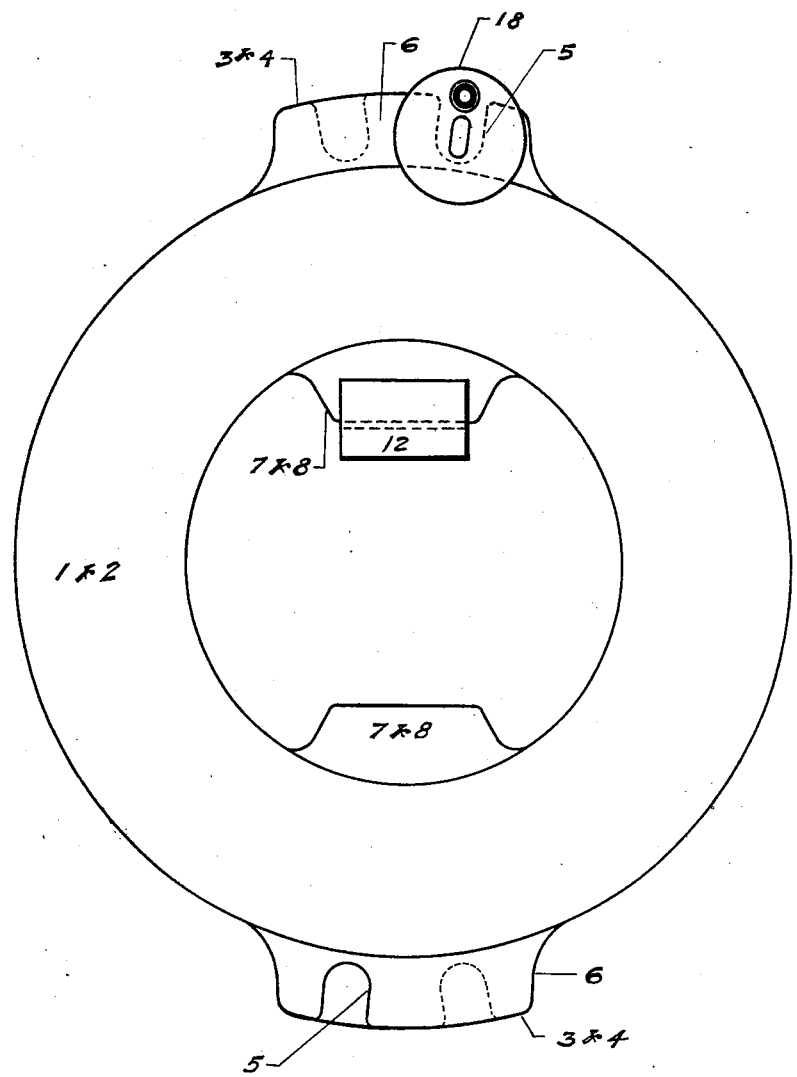

Fig. 4 is a plan view of a mold of circular form particularly showing one method of positioning the various elements, one opening device and one core-breaker key being shown in position. It will, however, be apparent that the shape of the mold is not an element of the invention, nor are the relative positions of the mold openers and core-breaker keys. The mold could be of straight form and the opening devices and core-breaker keys positioned all on one edge of the device, or a plurality of them could be employed in any spaced relationship along the opposed edges of the mold.

In the preferred form of my invention a mold in halves 1 and 2 is employed, having lugs 3 and 4 on one edge to support the mold separator; these lugs 3 and 4 are located opposite each other on the respective mold halves, each having a slot 5 and a continuous solid portion 6, the slotted and solid portions being staggered with respect of similar portions on the complementary lug on the other mold section. Other lugs 7 and 8, on these sections are provided for engaging the core-breaker key.

Within the mold is a core 9 having a protruding stem 10, and on the core is shown the article 11 to be molded or vulcanized.

The core-breaker key 12 has fingers 13, 14, 15, and 16 adapted to engage the core stem 10 and be engaged by the mold lugs 7 and 8 in a manner hereafter described.

Insertible within the slotted portion 5 of the lug 3 and bearing upon the solid portion 6 of the complementary lug 4 is a preferred mold separator in the form of a hydraulic jack having a piston 17 adapted to bear upon the solid portion 6 of lug 4, and a body portion 18 having an elongated neck terminating in a shoulder effect 19 adapted to be inserted within slot 5 of lug 3 and retained therein against displacement in the direction of the axis of the jack.

The operation of the device follows; Fig. 1 shows the mold ready for separation with the jack inserted within the lugs 3 and 4 and the removable core-breaker key 12 placed in position on the core stem 10, on which it is intended to fit with the minimum clearance in a manner assuring self maintenance.

Fig. 2 shows the first step in the separation process wherein the jack has broken the upper half of the mold 1 away from the core 9, separating said mold with respect of the lower half 2 to which the core has adhered by reason of its adhesive coating 11 until the mold lug 7 has come into contact with finger 13 of key 12. It is obvious that the core may happen to stick to the upper mold section 1 and thus separate first from section 2, but in this event the function of the core-breaker key 12 will merely be transposed to receive its contact on finger 16 with mold lug 8 of mold section 2. It will be noted in Fig. 2 that a further separation of the mold will impart motion to the key 12, which being interlocked with the core stem 10 and free of all connection with the lower mold 2, will pull the core stem 10 in the direction of motion thus breaking it away from the lower mold.

Fig. 3 shows the result of a further separation of the mold sections beyond the position assumed in Fig. 2. It will be noted that the key 12 has lifted the core clear of the lower mold 2 thus completing the operation. The finger 16 of key 12 is here shown contacting with the lug 8 of mold section 2 thus limiting the further separation of the mold, it being noted that the finger 13 has restricted a further movement of mold section 1 through its engagement with lug 7 thereon, and that the core 9 is held free of each mold section.

Upon completion of the operation, as shown in Fig. 3, the key 12 may be removed and the core permitted to drop back into mold 2 and the halves 1 and 2 separated to any desired degree by the free operation of the jack. The degree of separation of the halves of the mold to be permitted by the key device may be predetermined by the selection of keys having varying distances between the core engaging fingers and those contacting with the respective lugs on the core sections.

Having described my invention and the preferred form for carrying it into practice what I claim as new therein and desire to secure by Letters Patent is:—

1. In combination with a molding or vulcanizing device comprising separable mold sections and a forming core, a mold separator, and a key piece interposed between projections on the mold and engageable thereby and in engagement with the core, said key piece having means thereon for breaking the core from the mold and other means thereon for limiting the separation of the mold sections.

2. In combination with a molding or vulcanizing device comprising separable mold sections having projecting lugs on each edge thereof, a removable core within the mold having a stem projecting beyond the mold cavity, a power separator insertible between juxtaposed lugs on the edges of said mold sections, and a core-breaker key insertible between and engageable by other juxtaposed lugs on the edges of said mold sections and engaging the core stem.

3. In combination with a molding or vulcanizing device comprising separable mold sections, each section having juxtaposed and relatively wide lugs having an opening for the separator unit and a contiguous solid portion, said open and solid portions of each lug being staggered in respect of their vertical alinement with the corresponding portion of the juxtaposed or complementary lug on the other mold section on either of the mold sections and bear upon an alined solid portion of the opposed lug, a removable core within the mold having a stem projecting beyond the mold, a separator device insertible within the aforesaid open portions of the opposed lugs, and a core-breaker key insertible between other opposed lugs on the mold section and contactible by them and engaging the core stem.

4. In combination with a molding or vulcanizing device comprising separable mold sections having sets of corresponding and opposed lugs on their edges, a removable core within the mold having an outwardly protruding stem, a power separator insertible between a set of said mold lugs, and a core-breaker key in positive engagement with said core stem and having means thereon adapted to engage each of a set of said mold lugs when separation of the mold sections is effected, whereby motion is transmitted to said core stem.

5. In combination with a molding or vulcanizing device comprising a separable mold in halves, a core within the mold, a power means to impart primary separating motion to the mold halves, and a key interlocking with said core and having spaced means thereon to be successively engaged by said mold sections when they are moved, whereby the core will be secondarily moved with respect of either of the mold sections.

6. The combination with a separable mold in halves having a core therein; a core moving device in positive engagement with the core and having means thereon adapted to be successively engaged by portions of said mold, as the sections thereof are separated, whereby the core will be successively separated from each mold section.

In testimony whereof I have affixed my signature.

EDISON G. HULSE.